United States Patent
Lagnado (10) Patent No.: US 9,655,044 B2
(45) Date of Patent: May 16, 2017

(54) RADIO DEVICE

(75) Inventor: Isaac Lagnado, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1403 days.

(21) Appl. No.: 13/260,363

(22) PCT Filed: Nov. 25, 2009

(86) PCT No.: PCT/US2009/065845
§ 371 (c)(1),
(2), (4) Date: Sep. 25, 2011

(87) PCT Pub. No.: WO2011/065942
PCT Pub. Date: Jun. 3, 2011

(65) Prior Publication Data
US 2012/0072748 A1    Mar. 22, 2012

(51) Int. Cl.
*H04W 52/02*        (2009.01)
*G06F 1/32*         (2006.01)

(52) U.S. Cl.
CPC ....... *H04W 52/0225* (2013.01); *G06F 1/3287* (2013.01); *H04W 52/0251* (2013.01); *H04W 52/0261* (2013.01)

(58) Field of Classification Search
None
See application file for complete search history.

(56) References Cited

U.S. PATENT DOCUMENTS

| | | | |
|---|---|---|---|
| 6,731,924 B2 * | 5/2004 | Gushiken | 455/343.1 |
| 8,046,610 B2 * | 10/2011 | He et al. | 713/310 |
| 2002/0086635 A1 | 7/2002 | Tomono | |
| 2007/0036096 A1 | 2/2007 | Sinivaara | |
| 2009/0239574 A1 | 9/2009 | Hussain | |

FOREIGN PATENT DOCUMENTS

| | | |
|---|---|---|
| EP | 1089578 A2 | 4/2001 |
| EP | 1973026 A1 | 9/2008 |
| KR | 102000003352 A | 6/2000 |
| KR | 102000006152 A | 10/2000 |
| WO | WO-00/22837 A2 | 4/2000 |
| WO | WO-2005/002137 A1 | 1/2005 |
| WO | WO-2007133526 | 11/2007 |

OTHER PUBLICATIONS

Extended European Search Report, Application No. 09851750.1, Date: Sep. 26, 2013, pp. 1-7.
ISA/KR, International Search Report dated Jul. 26, 2010, PCT/US2009/065845, filed Nov. 25, 2009.
Taiwan Office Action cited in Appl. No. 99140535 mailed Dec. 22, 2014; 5 pages.

* cited by examiner

*Primary Examiner* — Tim T Vo
(74) *Attorney, Agent, or Firm* — HP Patent Department (57) ABSTRACT

A method including configuring a processor to determine whether a radio device is communicating with an additional device, configuring the radio device to enter into a power stale in response to whether the radio device is communicating with the additional device, and modifying an amount of power supplied to the radio device in response to the power slate of the radio device.

18 Claims, 6 Drawing Sheets

RADIO DEVICE

CROSS-REFERENCE TO RELATED APPLICATION

This application claims priority to PCT Patent Application Ser. No. PCT/US2009/065845, which was filed on Nov. 25, 2009 which is herein included by reference in its entirety for all purposes.

BACKGROUND

When a radio device is communicating with one or more additional devices, the radio device can be configured to receive electrical energy. Once the radio device has received the electrical energy, the radio device can be configured to communicate with one or more additional devices by sending and/or receiving data to one or more of the additional devices.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
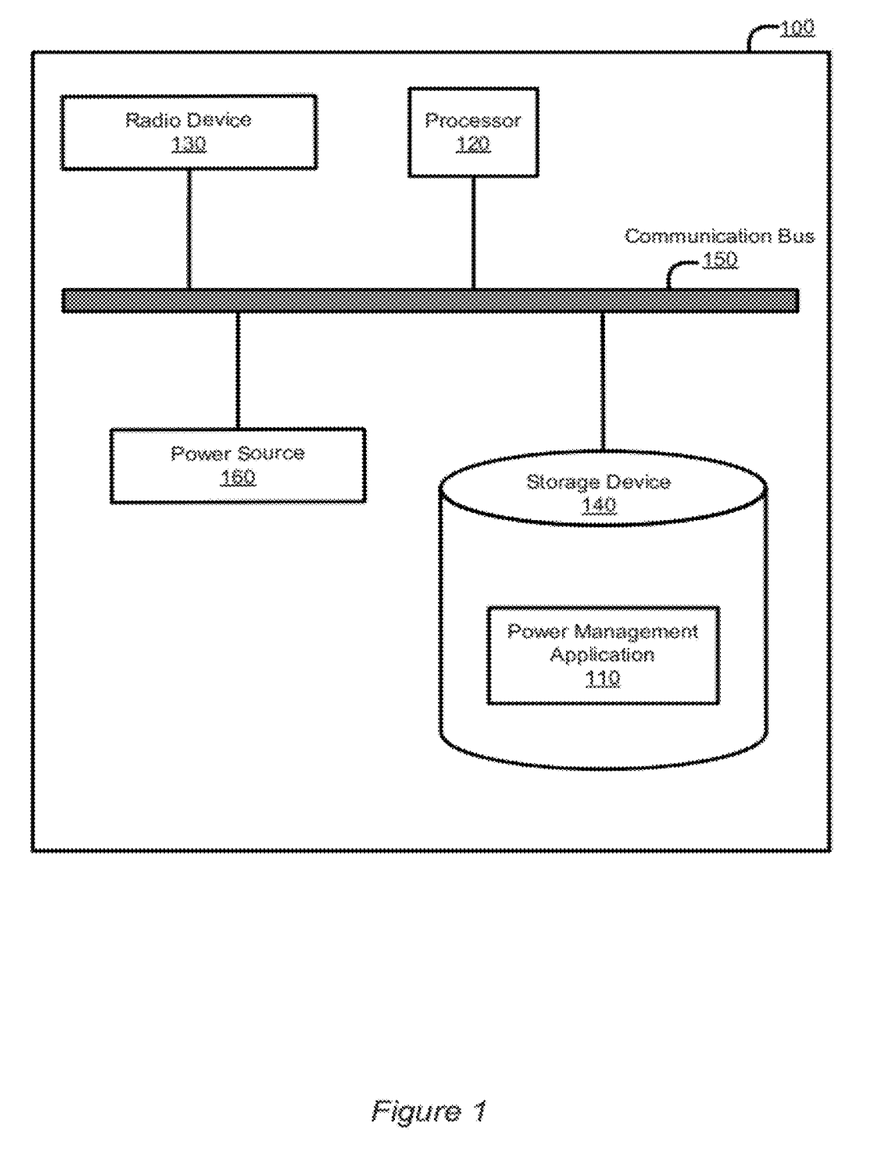
FIG. 1 illustrates a machine coupled to a radio device and a power source according to an embodiment of the invention.

FIG. 1 illustrates a machine 100 coupled to a radio device 130 and a power source 160 according to an embodiment of the invention. In one embodiment, the machine 100 is a desktop, a laptop, a server, and/or any device that a radio device 130 can be coupled to. As illustrated in FIG. 1, the machine 100 is coupled to a storage device 170, a processor 120, a radio device 130, a power source 160, and a communication bus 150 for the machine 100 and/or one or more components of the machine 100 to communicate with one another.

Further, as illustrated in FIG. 1, the storage device 140 stores a power management application 110. In other embodiments, the machine 100 includes additional components and/or is coupled to additional components in addition to and/or in lieu of those noted above and as illustrated in FIG. 1.

As noted above, the machine 100 includes a processor 120. The processor 120 sends data and/or instructions to one or more components of the machine 100, such as the storage device 140, the radio device 130, the power source 160, and the power management application 110. Additionally, the processor 120 receives data and/or instruction from one or more components of the machine 100, such as the radio device 130 and the power management application 110.

The power management application 110 is an application which can configure the processor 120 to monitor and/or poll the radio device 130 to determine whether the radio device 130 is communicating with one or more additional devices. For the purposes of this application, a radio device 130 is communicating with an additional device when one or more components of the radio device 130 are sending and/or receiving data.

One or more components of the radio device 130 are sending and/or receiving data when the radio device 130 is establishing a connection with an additional device, when the radio device 130 is maintaining a connection with an additional device, and/or when the radio device 130 is transferring data between the radio device 130 and an additional device. In other embodiments, the radio device 130 can be communicating with an additional device when performing additional functions in addition to and/or in lieu of those noted above.

Additionally, the power management application 110 can configure the radio device 130 to enter and/or transition into one or more power states in response to determining whether the radio device 130 is communicating with one or more additional device. Further, the power management application 110 can modify an amount of power supplied to the radio device 130 in response a power state of the radio device 130.

The power management application 110 can be firmware which is embedded onto the machine 100 or the radio device 130. In another embodiment, the power management application 110 operates as a BIOS of the machine 100. In other embodiments, the power management application 110 is a software application stored on the machine 100 within ROM or on the storage device 140 accessible by the machine 100 or the power management application 110 is stored on a computer readable medium readable and accessible by the machine 100 from a different location.

Additionally, in one embodiment, the storage device 140 is included in the machine 100. In other embodiments, the storage device 140 is not included in the machine 100, but is accessible to the machine 100 utilizing a network interface of the machine 100. The network interface can be a wired or wireless network interface card.

In a further embodiment, the power management application 110 is stored and/or accessed through a server coupled through a local area network or a wide area network. The power management application 110 communicates with devices and/or components coupled to the machine 100 physically or wirelessly through a communication bus 150 included in or attached to the machine 100. In one embodiment the communication bus 150 is a memory bus. In other embodiments, the communication bus 150 is a data bus.

As noted above, the power management application 110 can configure a processor 120 to monitor and/or poll the radio device 130 to determine whether the radio device 130 is communicating with an additional device. When configuring the processor 120, the power management application 110 can send one or more instructions for the processor 120 to monitor and/or poll the radio device 130. One or more of the instructions can continuously or periodically be sent by the power management application 110 for the processor 120 to monitor and/or poll the radio device 130 to determine whether the radio device 130 is communicating with an additional device.

In determining whether the radio device 130 is communicating with an additional device, the power management application 110 can monitor and/or poll the radio device 130 and/or one or more components of the radio device 130 to for data being sent to or from the radio device 130. In another embodiment, the power management application 110 can monitor and/or poll one or more communication ports on the machine 100 for data being sent to the radio device 130 and/or to one or more components of the radio device 130 from an additional device.

A radio device 130 is a communication device coupled to the machine 100 which can communicate with one or more additional devices by receiving and/or sending data. The radio device 130 can send and/or receive data periodically or in response to receiving data from an additional device.

Additionally, the radio device 130 can enter and/or transition into one or more power states in response to whether the radio device 130 is communicating with an additional device. When the radio device 130 enters and/or transitions into one or more of the power states, an amount of power supplied to the radio device 130 from a power source 160 of the machine 100 can be modified.

In one embodiment, the radio device 130 is a network interface device and can be configured to communicate with one or more additional devices wirelessly or through a physical connection. In other embodiments, the radio device 130 can be other additional communication devices which can be configured to communicate with one or more additional devices by receiving and/or sending data.

As noted above, the radio device 130 can include one or more components. In one embodiment, one or more of the components can include a transceiver and/or a transmitter. The transceiver can be configured to receive data when communicating with an additional device. Additionally, the transmitter can be configured to send data when communicating with an additional device.

Further, an additional device can also be a communication device which is configured to communicate with the radio device 130. In one embodiment, the additional device is also a network interface device. In other embodiments, the additional device can be any additional communication device which can be configured to communicate with the radio device 130 wirelessly or through a physical connection by sending and/or receiving data.

As noted above, the radio device 130 can be configured to enter and/or transition into one or more power states. In configuring the radio device 130 to enter and/or transition into one or more of the power states, the power management application 110 can instruct and/or configure the processor 120 to send one or more instructions for the radio device 130 to enter and/or transition into a power state in response to whether the radio device 130 is communicating with an additional device.

In one embodiment, if the processor 120 identifies that the radio device 130 is communicating with an additional device, the processor 120 can notify the power management application 110 that the radio device 130 communicating. The power manager application 110 can then send an instruction for the processor 120 to access the radio device 130 and send instructions for the radio device 130 to enter into the high power state.

In another embodiment, if the processor 120 identifies that the radio device 130 is idle, the processor 120 can notify the power management application 110 that the radio device 130 is idle. The power management application 110 then sends an instruction for the processor 120 to access the radio device 130 and send instructions for the radio device 130 to enter into the low power state. In other embodiments, one or more components of the radio device 130 can configure and/or instruct the radio device 130 to enter and/or transition into one or more of the power states.

A power state is a state the radio device 130 can enter and/or transition into in response to whether the radio device 130 is communicating with an additional device. Additionally, the power state corresponds to an amount of power consumed by the radio device 130. In one embodiment, the radio device 130 can enter and/or transition into a high power state when the radio device is communicating with an additional device. Additionally, when in the high power state, the radio device 130 can consume more power for the radio device 130 and one or more components of the radio device 130 to communicate with the additional device.

In another embodiment, the radio device 130 can enter and/or transition into a low power state when the radio device 130 is idle. For the purposes of this application, the radio device 130 is determined to be idle when one or more components of the radio device 130 are not communicating with an additional device. When the radio device 130 is in the low power state, the radio device 130 consumes less power than when the radio device is in the power state since one or more components of the radio device 130 are not communicating with an additional device. In other embodiments, one or more of the power states include additional power states in addition to and/or in lieu of those noted above.

In one embodiment, the power management application 110 can configure the processor 120 to send an instruction for the radio device 130 to enter and/or transition into a high power state when the radio device 130 is communicating with one or more additional devices. In another embodiment, the power management application 110 can configure the processor 120 to send an instruction for the radio device 130 to enter and/or transition into a low power state when the radio device 130 idle.

In other embodiments, the radio device 130 can poll one or more components of the radio device 130 to determine when one or more components of the radio device 130 are communicating with an additional device. In response to whether the components are communicating with additional device, the radio device 130 can automatically enter and/or transition between one more of the power states and send information of entering and/or transitioning between the power states to the power management application 110.

As noted above, the radio device 130 can enter and/or transition between one or more of the power states periodically or in response to receiving data from an additional device. Once the radio device 130 has entered and/or transitioned into one or more of the power states, the power management application 110 can configure a power source 160 to modify an amount of power supplied to the radio device 130.

A power source 160 is a power device of the machine 100 which can be configured to receive, store, and/or transfer power and/or electrical energy. Additionally, the power source 160 is configured to supply and modify an amount of power supplied to one or more components of the machine 100, such as the radio device 130, in response to a power state of the radio device 130. In one embodiment, the power source 160 is a power supply of the machine 100. In other embodiments, the power source 160 can be additional electrical energy storage devices which can be configured to supply and modify an amount of power supplied to the radio device 130.

When modifying an amount of power supplied to the radio device 130, the power management application 110 configures the power source 160 to increase or decrease an amount of electrical energy supplied to the radio device 130. In one embodiment, if the radio device 130 is in a high power state, the power management application 110 configures the power source 160 to increase an amount of electrical energy supplied to the radio device 130. In another embodiment, if the radio device 130 is in a low power state, the power management application 110 configures the power source 160 to decrease an amount of electrical energy supplied to the radio device 130.

Figure 2:
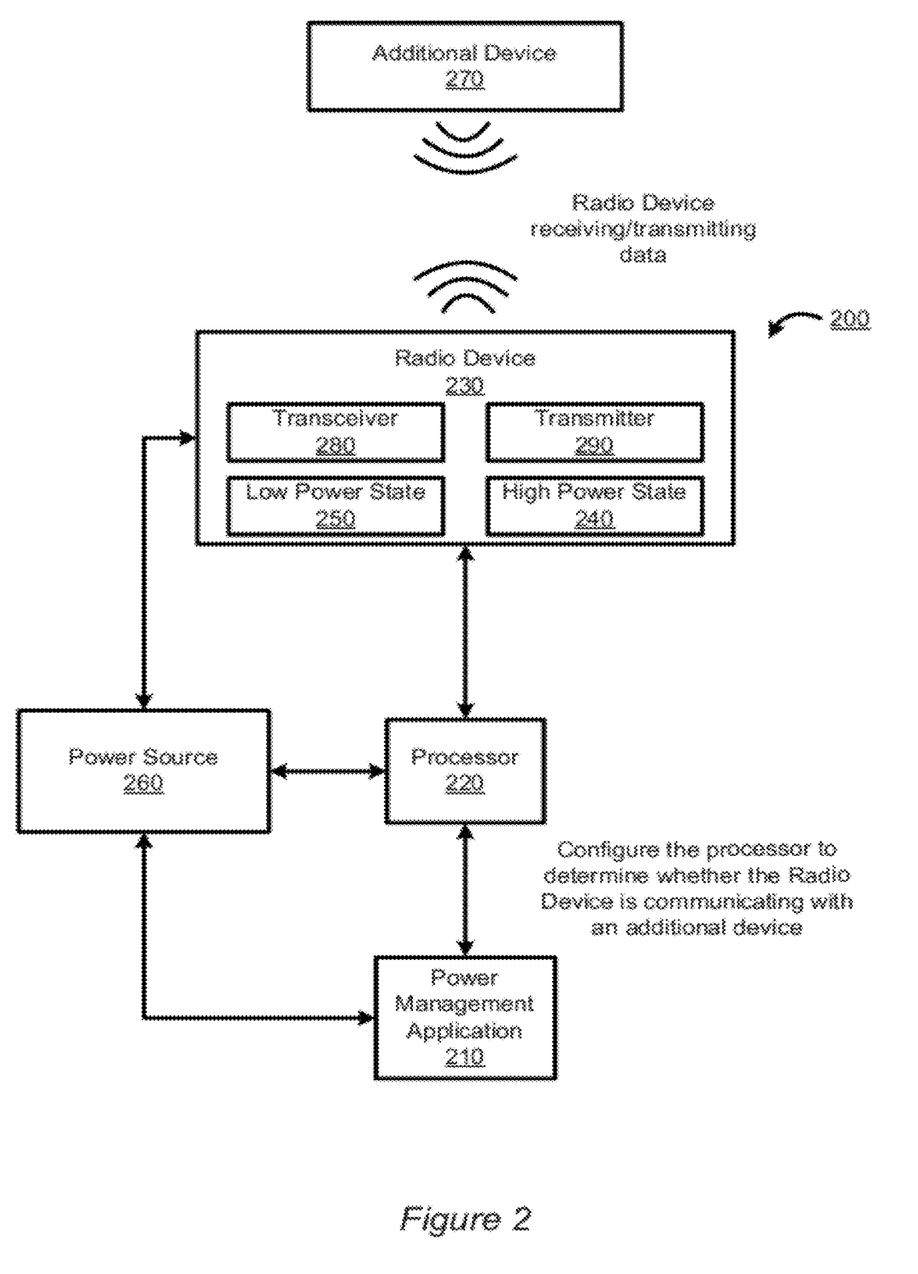
FIG. 2 illustrates a radio device communicating with one or more additional devices according to an embodiment of the invention.

FIG. 2 illustrates a radio device 230 communicating with one or more additional devices 270 according to an embodiment of the invention. As illustrated in FIG. 2, the radio device 230 is coupled to a power supply 260, a processor 220, and a power management application 210 of a machine 200.

As noted above, the radio device 230 is a communication device which can communicate with an additional device 270 by sending and/or receiving data. Further, as shown in FIG. 2, the additional device 270 is also a communication device which can communicate with the radio device 230 by receiving and/or transmitting data.

Additionally, as noted above, the radio device 230 sends and/or receives data utilizing one or more components included in the radio device 230, such as a transceiver 280 and/or a transmitter 290. One or more of the components send and/or receive data when establishing a connection with the additional device 270, when maintaining a connection with the additional device 270, and/or when transferring data between the radio device 230 and the additional device 270.

As illustrated in FIG. 2, a power management application 210 is coupled to a processor 220 and a power supply 260 of the machine 200. As noted above, the power management application 210 can configure the processor 220 to monitor and/or poll the radio device 230 determine whether the radio device 230 is communicating with the additional device 270. In other embodiments, the radio device 230 can send information to the processor 220 and/or the power management application 210 when the transceiver 280 and/or the transmitter 290 are communicating with the additional device 270.

Additionally, as illustrated in FIG. 2, the radio device 230 can enter and/or transition into one or more power states 240, 250 in response to whether the radio device 230 is communication with an additional device 270. As noted above, the radio device 230 enters and/or transitions into a high power state 240 when the processor 220 determines that the radio device 230 is communicating with an additional device 270.

Further, the radio device 230 enters and/or transitions into a low power state 250 when the processor determines that the radio device 230 is idle. As noted above, the radio device 230 is idle when none of the components of the radio device 230 are communicating with an additional device 270. In other embodiments, the radio device 230 can include additional power states in addition to and/or in lieu of those noted above and illustrated in FIG. 2.

Further, as noted above, the power management application 210 can modify an amount of power supplied to the radio device 230 in response to a power state of the radio device 230. As illustrated in FIG. 2, the power management application 210 can configure the processor 220 to send one or more instructions to modify an amount of electrical energy the power source 260 provides the radio device 230.

Figure 3A:
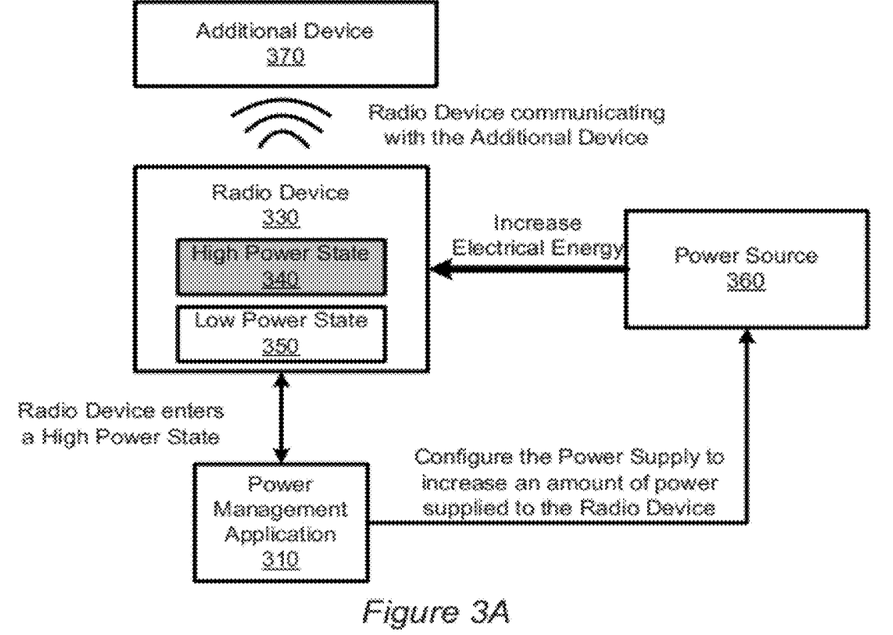
FIG. 3A illustrates a block diagram of a radio device entering a high power state in response to communicating with an additional device according to an embodiment of the invention.

FIG. 3A illustrates a block diagram of a radio device 330 entering a high power state 340 in response to communicating with an additional device 370 according to an embodiment of the invention. As noted above, the radio device 330 can enter and/or transition into one or more power states 340, 350 in response to whether the radio device 330 is communicating with an additional device 370. As shown in FIG. 3A, one or more of the power states can include a high power state 340 and a low power state 350.

Additionally, as illustrated in FIG. 3A, in one embodiment, the power management application 310 determines that the radio device 330 is communicating with an additional device 370 since the radio device 330 is sending and/or receiving data with the additional device 370. As noted above, the power management application 310 can configure a processor to monitor and/or poll the radio device 330 when determining whether the radio device 330 is communicating with the additional device 370. In other embodiments, the power management application 310 can receive information of a communication from the radio device 330.

As shown in FIG. 3A, in response to the radio device 330 communicating with the additional device 330, the radio device 330 enters and/or transitions into the high power state 340. As noted above, the radio device 330 can be instructed by the processor and/or the power management application 310 to enter the high power state 340. In other embodiments, the radio device 330 can enter and/or transition into the high power state 340 without a prompt from the processor or the power management application 310.

As noted above, when in the high power state 340, the radio device is consuming more power than when the radio device 330 is in a low power state 350. Additionally, as illustrated in FIG. 3A, the power management application 310 additionally configures a power source 360 of a machine to increase an amount of power supplied to the radio device 330. As illustrated in FIG. 3, in one embodiment, the power source 360 is a power supply 360 and the power supply 360 is configured to increase an amount of electrical energy supplied to the radio device 330.

Figure 3B:
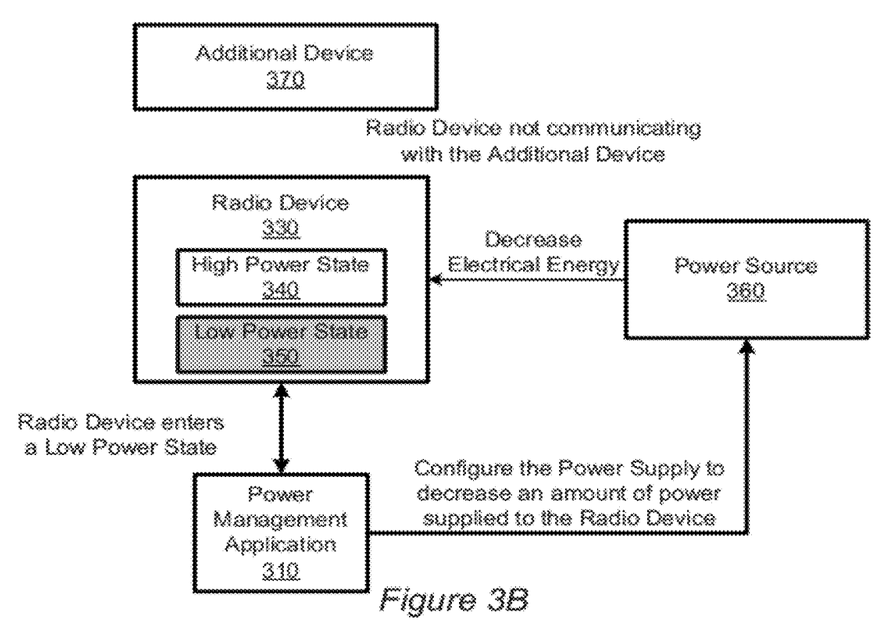
FIG. 3B illustrates a block diagram of a radio device transitioning to a low power state when not communication with an additional device according to an embodiment of the invention.

FIG. 3B illustrates a block diagram of a radio device 330 transitioning to a low power state 350 when not communication with an additional device 370 according to an embodiment of the invention. As noted above, the radio device 330 is idle when not communicating with any additional device 370.

Additionally, as noted above, the power management application 310 can initially configure a processor of a machine to poll and/or monitor the radio device 330 to determine whether the radio device 330 is communicating with an additional device 370. In other embodiments, the radio device 330 is not monitored or polled and the radio device 330 can send information to the processor and/or the power management application 310 specifying whether the radio device 330 is communicating with an additional device 370.

As illustrated in the present embodiment, the radio device 330 is not sending and/or receiving data with the additional device 370. As a result, the radio device 330 is not communicating with the additional device 360 and the radio device 330 is idle.

As shown in FIG. 3B, when the radio device 330 is idle, the radio device 330 can to enter and/or transition into a low power state 350. As noted above, the radio device 330 can be instructed to enter and/or transition into the low power state or the radio device 330 can enter and/or transition into the low power state itself. Once the radio device has entered/transitioned into the low power state, the power management application 310 configures a power source 360 of the machine to decrease an amount of power supplied to the radio device 330.

As noted above, when configuring the power source 360 to decrease an amount of power supplied, the power management application 310 configures the processor of the machine to instruct the power source 360 to decrease an amount electrical energy supplied to the radio device 330. As illustrated in FIG. 3B, the power source 360 decreases an amount of electrical energy supplied to the radio device 330.

Figure 4:
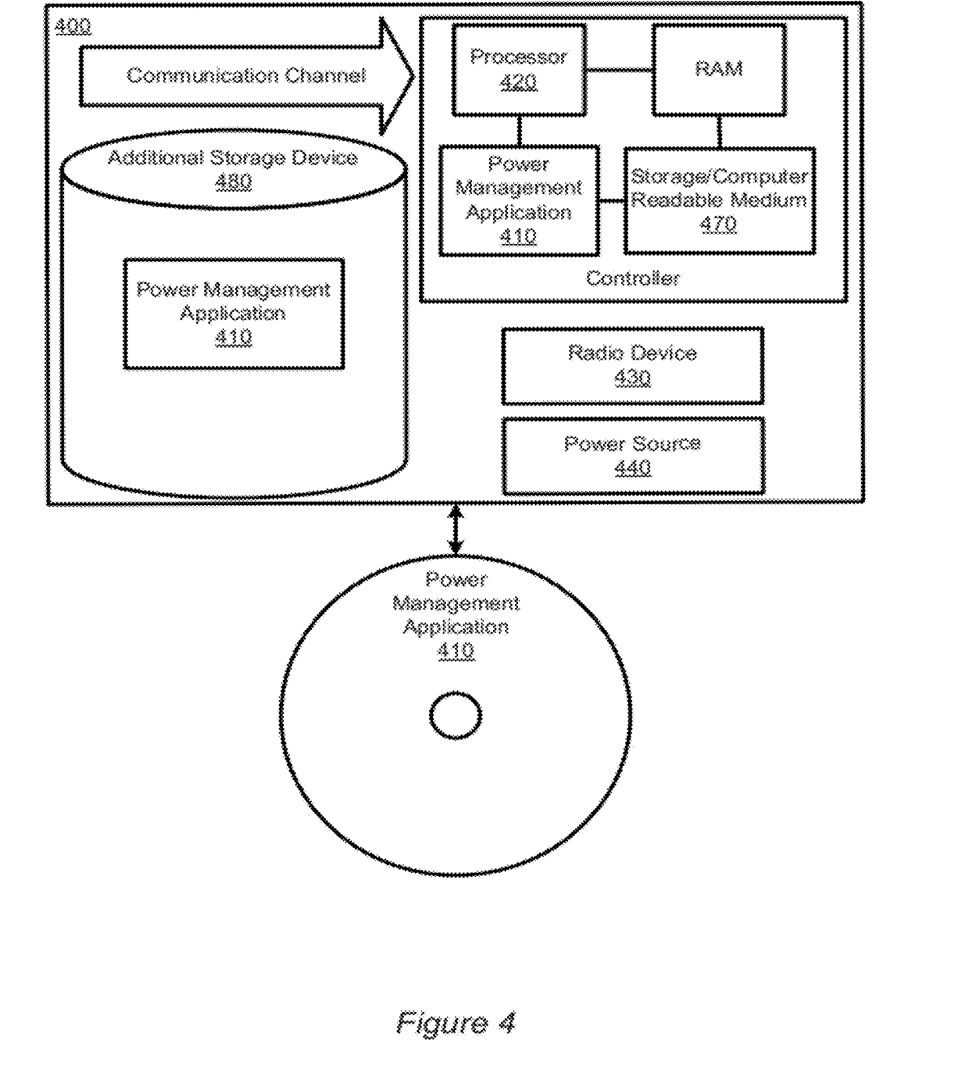
FIG. 4 illustrates a machine with an embedded power management application and a power management application stored on a removable medium being accessed by the machine according to an embodiment of the invention.

FIG. 4 illustrates a machine 400 with an embedded power management application 410 and a power management application 410 stored on a removable medium being accessed by the machine 400 according to an embodiment of the invention. For the purposes of this description, a removable medium is any tangible apparatus that contains, stores, communicates, or transports the application for use by or in connection with the machine 400. As noted above, in one embodiment, the power management application 410 is firmware that is embedded into one or more components of the machine 400 as ROM. In other embodiments, the power management application 410 is a software application which is stored and accessed from a hard drive, a compact disc, a flash disk, a network drive or any other form of computer readable medium that is coupled to the machine 400.

Figure 5:
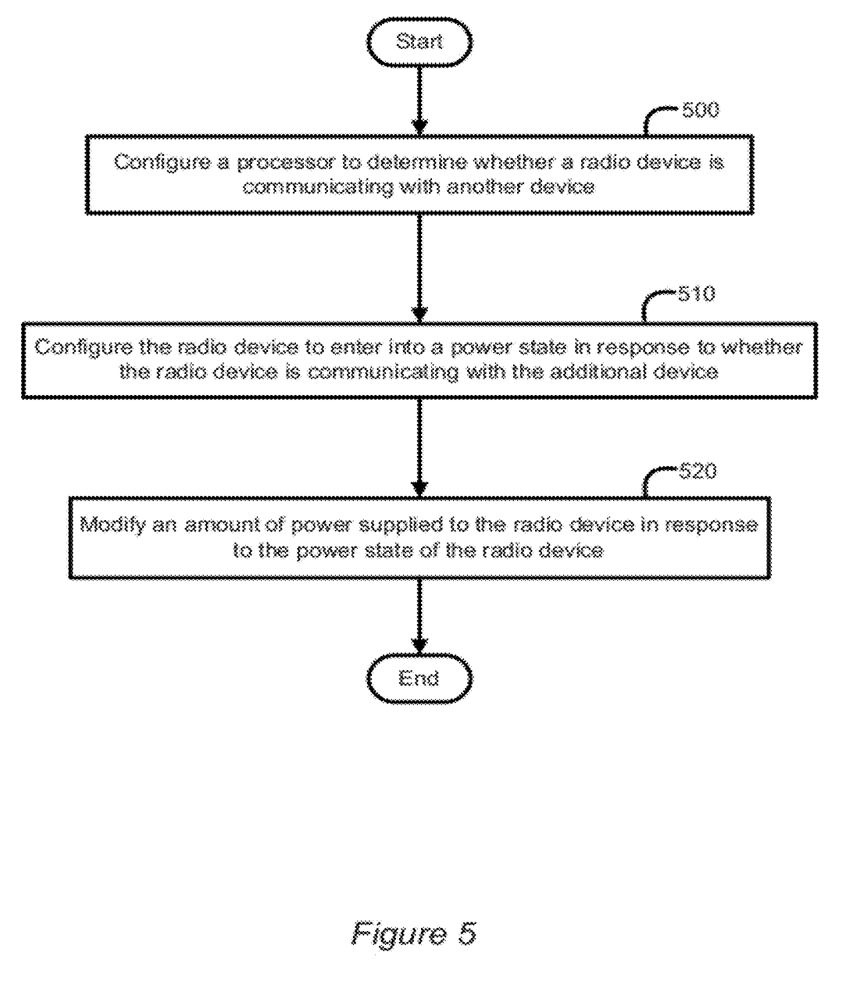
FIG. 5 is a flow chart illustrating a method for managing an amount of power supplied to a radio device in response to a power state of the radio device according to an embodiment of the invention.

FIG. 5 is a flow chart illustrating a method for managing an amount of power supplied to a radio device in response to a power state of the radio device according to an embodiment of the invention. The method of FIG. 5 uses a machine with a processor, a radio device, a power source, and a power management application. In other embodiments, the method of FIG. 5 uses additional components and/or devices in addition to and/or in lieu of those noted above and illustrated in FIGS. 1, 2, 3A, 3B, and 4.

As noted above, the power management application initially configures a processor of the machine to monitor and/or poll a radio device to determine whether the radio device is communicating with one or more additional devices 500. Additionally, as noted above, the power management application can operate as a firmware of the radio device or the power management application can operate as a BIOS of the machine. In other embodiments, the radio device is not monitored or polled and the radio device sends information to the processor and/or the power management application when the radio device is communicating with an additional device.

As noted above, the radio device is a communication device coupled to the machine which can communicate with one or more additional devices wirelessly or through a physical connection by receiving and/or sending data. In one embodiment, the radio device is a network interface device. Additionally, as noted above, the radio device can include one or more components. One or more of the components can include one or more transmitters and/or one or more transceivers.

Further, one or more of the additional devices can also be communication devices configured to communicate with the radio device by sending and/or receiving data.

As noted above, in response to determining whether the radio device is communicating with the additional device, the power management application can proceed to configure the radio device to enter and/or transition into one or more power states 510. As noted above, one or more of the power states can include a high power state and a low power state. In other embodiments, one or more of the power states can include additional power state levels in addition to and/or in lieu of those noted above.

When configuring the radio device to enter into one or more of the power states, the power management application can configure a processor of the machine to send one or more instructions for the radio device to transition to and transition from one or more of the power states. In one embodiment, if the power management application determines that the radio device is currently communicating with the additional device, the power management can send an instruction for the radio device to enter into a high power mode.

In another embodiment, if the power management application determines that the radio device is idle, the power management application can send an instruction for the radio device to transition into a low power mode. As noted above, the radio device is idle when the radio device is not communicating with an additional device.

In other embodiments, the radio device can automatically transition between one or more of the power states in response to whether the radio device is communicating with an additional device. The radio device can then send information of entering and/or transitioning between the power states to the processor and/or the power management application.

Once the radio device has entered and/or transitioned into one or more of the power states, the power management application can proceed to configure a power source of the machine to modify an amount of power supplied to the radio device in response to the power state of the radio device 520. As noted above, in one embodiment, the power source of the machine is a power supply of the machine.

When modifying an amount of power supplied to the radio device, the power management application can configure the power source to increase or decrease an amount of electrical energy supplied to the radio device. In one embodiment, if the radio device is in a high power state, the power management application can configure the power source to increase an amount of electrical energy supplied to the radio device. In another embodiment, if the radio device is in a low power state, the power management application can configure the power source to decrease an amount of electrical energy supplied to the radio device.

The method is then complete or the power management application can continue to configure the processor monitor and/or poll the radio device to determine whether a radio device is communicating with one or more additional devices and proceed to modify an amount of power supplied to the radio device in response to a power state of the radio device. In other embodiments, the method of FIG. 5 includes additional steps in addition to and/or in lieu of those depicted in FIG. 5.

Figure 6:
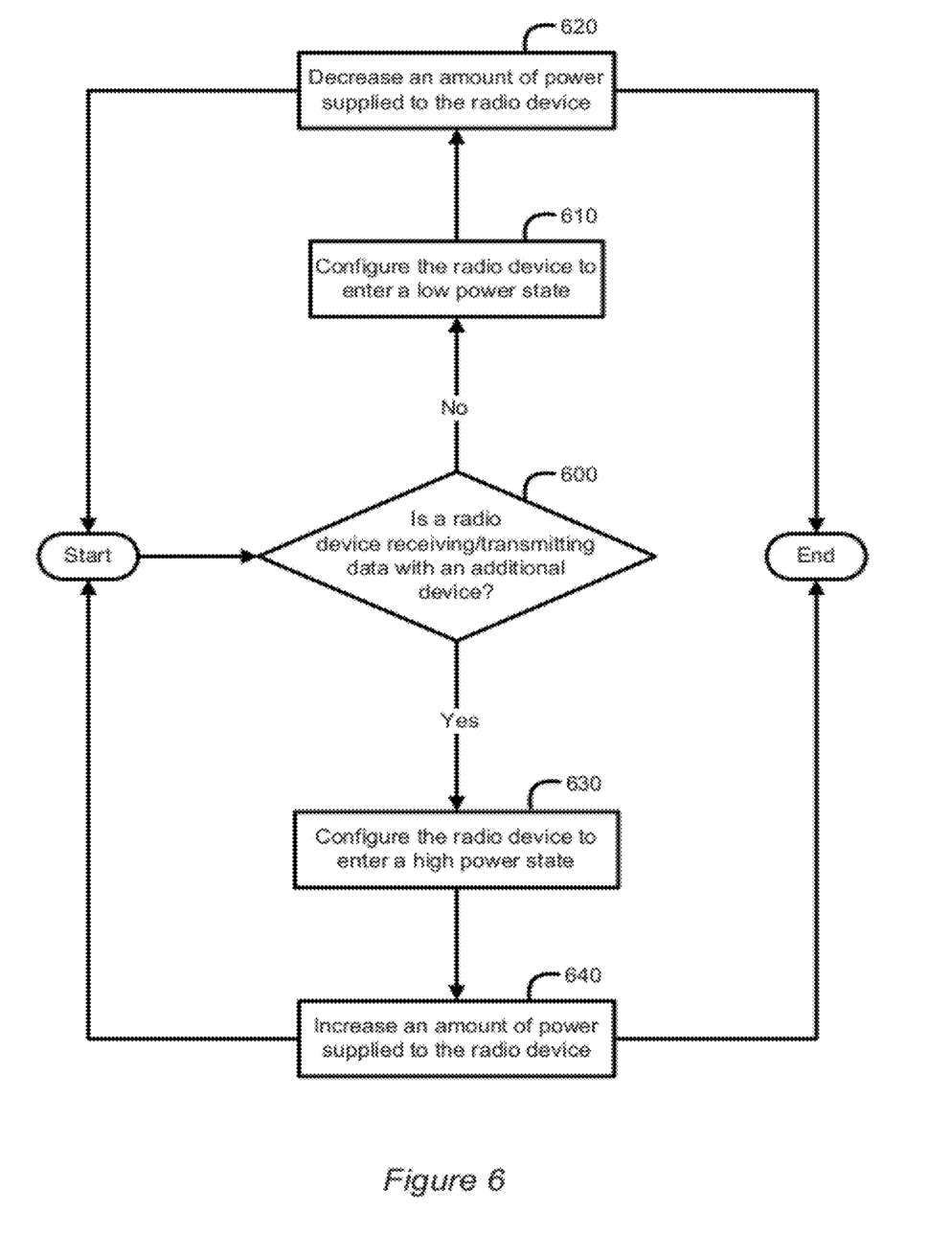
FIG. 6 is a flow chart illustrating a method for managing an amount of power supplied to a radio device in response to a power state of the radio device according to another embodiment of the invention.

FIG. 6 is a flow chart illustrating a method for managing an amount of power supplied to a radio device in response to a power state of the radio device according to another embodiment of the invention. Similar to the method disclosed in FIG. 5, the method of FIG. 6 uses a machine with a processor, a radio device, a power source, and a power management application. In other embodiments, the method of FIG. 6 uses additional components and/or devices in addition to and/or in lieu of those noted above and illustrated in FIGS. 1, 2, 3A, 3B, and 4.

As noted above, the power management application can be launched from computer readable memory and initially configures the processor of the machine to determine whether the radio device is receiving and/or transmitting data with an additional device 600. Additionally, as noted above, the radio device is communicating with an additional device when one or more components of the radio device are sending and/or receiving data.

One or more of the components are sending and/or receiving data when establishing a connection with an additional device, when maintaining a connection with an additional deice, and/or when transferring data between the radio device and an additional device.

When determining whether the radio device is communicating with an additional device, the processor and/or the power management application can poll one or more components on the radio device for data being received and/or transmitted. If the processor and/or the power management application detect one or more of the components receiving and/or transmitting data, the power management application will determine that the radio device communicating with an additional device.

Additionally, if the processor and/or the power management application do not detect any of the components receiving and/or transmitting data, the power management application will determine that the radio device is idle and the radio device is not receiving communicating with an additional device. In other embodiments, the radio device is not monitored or polled and the radio device sends information to the processor and/or the power management application specifying whether the radio device is communicating and additional device.

As noted above, in one embodiment, if the radio device is not receiving and/or transmitting data with an additional device, the radio device is idle and the power management application will configure the radio device to enter into a low power state 610. As noted above, the low power state consumes less power than a high power state. In other embodiments, the radio device can automatically enter the low power state and send information of entering the low power state to the processor and/or the power management application.

Further, once the radio device has entered into the low power state, the power management application will additionally decrease an amount of power supplied to the radio device 620. In one embodiment, when decreasing an amount of power supplied to the radio device, the power management application configures a power source of the machine to transfer a less amount of electrical energy to the radio device.

In another embodiment, if the power management application determines that the radio device is receiving and/or transmitting data from an additional device, the power management application will configure the radio device to enter into a high power state 630. In other embodiments, the radio device can automatically enter or transition into the high power state and send information of entering or transitioning into the high power state to the processor and/or the power management application.

As noted above, the high power state consumes more power than the low power state. Additionally, when in the high power state, the radio device is communicating with an additional device by sending and/or receiving data.

Further, once the radio device has transitioned into the high power state, the power management application will additionally increase an amount of power supplied to the radio device 640. In one embodiment, when increasing an amount of power supplied to the radio device, the power management application configures a power source of the machine to transfer more electrical energy to the radio device.

Once the radio device has entered into one or more power states and an amount of power supplied to the radio device has been modified, the method is then complete or the power management application can continue to configure the processor to determine whether a radio device is communicating with one or more additional devices and proceed to modify an amount of power supplied to the radio device in response to a power stale of the radio device. In other embodiments, the method of FIG. 6 includes additional steps in addition to and/or in lieu of those depicted in FIG. 6.

By identifying when a radio device is communicating with an additional device, an amount of power supplied to the radio device can be increased when the radio device is communicating with the additional device and the amount of power supplied to the radio device can be decrease when the radio device is idle. As a result, the radio device can be supplied with sufficient power when transmitting and/or receiving data with the additional device and power can be saved when the radio device is not communicating with one or more additional devices.

What is claimed is:

1. A method comprising:
configuring a processor to determine whether a radio device is communicating with an additional device;
configuring the radio device to transition from a first power state to a second power state in response to whether the radio device is communicating with the additional device; and
configuring a power device to modify an amount of power supplied to the radio device in response to the second power state of the radio device.

2. The method of claim 1, wherein the second power state is a high power state, and wherein the radio device enters the high power state when the radio device is determined to be communicating with the additional device.

3. The method of claim 2 wherein the amount of power supplied to the radio device is increased when the radio device enters the high power state.

4. The method of claim 1, wherein the second power state is a low power state, and further wherein the radio device enters the low power state when the radio device is determined to not be communicating with the additional device.

5. The method of claim 4 wherein the amount of power supplied to the radio device is decreased when the radio device enters the low power state.

6. The method of claim 1 wherein the radio device is determined to be communicating with the additional device when a transceiver of the radio device is receiving data from the additional device or when a transmitter of the radio device is transmitting data to the additional device.

7. A machine comprising:
a processor;
a radio device configured to communicate with an additional device;
a power source; and a power management application executable by the processor from a storage medium and configured to:
  determine whether the radio device is communicating with an additional device,
  configure the radio device to transition from a first power state to a second power state in response to whether the radio device is communicating with the additional device, and
  configure the power source to modify an amount of power supplied to the radio device in response to the second power state of the radio device.

8. The machine of claim 7 wherein the radio device enters a high power state when the radio device is communicating with the additional device, and wherein the radio device enters a low power state when the radio device is not communicating with the additional device.

9. The machine of claim 7 wherein the power source is configured to increase an amount of electrical energy supplied to the radio device when the radio device transitions from a low power state to a high power state and the power source is configured to decrease an amount of electrical energy supplied to the radio device when the radio device transitions from the high power state to the low power state.

10. The machine of claim 7 wherein the power management application operates as a firmware on the radio device.

11. The machine of claim 7 wherein the power management application operates as a BIOS of the machine.

12. A non-transitory computer-readable medium comprising:
  a power management application executable by a processor to:
    determine whether a radio device of a machine is communicating with an additional device;
    configure a power device to increase an amount of power supplied to the radio device when the radio device is communicating with the additional device; and
    configure the power device to decrease the amount of power supplied to the radio device when the radio device is not communicating with the additional device.

13. The non-transitory computer-readable medium of claim 12 wherein the radio device enters a high power state when the radio device periodically transmits data to the additional device.

14. The non-transitory computer-readable medium of claim 12 wherein the radio device enters a high power state in response to receiving data from the additional device.

15. The non-transitory computer-readable medium of claim 12 wherein the radio device enters a low power state when the radio device is not transmitting or receiving data.

16. The non-transitory computer-readable medium of claim 12 wherein the power management application is to configure the power device to provide a first amount of power to the radio device when the radio device is communicating with the additional device, and to configure the power device to provide a second amount of power to the radio device when the radio device is not communicating with the additional device.

17. The machine of claim 7 wherein the power management application is to configure a power source to supply a first amount of power to the radio device when the radio device is in the first power state, and to configure the power source to supply a second amount of power to the radio device when the radio device is in the second power state.

18. The method of claim 1 further comprising configuring the power device to supply a first amount of power to the radio device when the radio device is in the first power state, and configuring the power device to supply a second amount of power to the radio device when the radio device is in the second power state.

* * * * *